A. Atwood,
Car Wheel.

No. 498. Reissued, Sept. 22. 185

UNITED STATES PATENT OFFICE.

ANSON ATWOOD, OF TROY, NEW YORK.

IMPROVEMENT IN CAST-IRON CAR-WHEELS.

Specification forming part of Letters Patent No. 5,112, dated May 15, 1847; Reissue No. 498, dated September 22, 1857.

*To all whom it may concern:*

Be it known that I, ANSON ATWOOD, of Troy, in the county of Rensselaer and State of New York, have invented a new and useful Improvement in Cast-Iron Wheels for Railroad-Cars; and I do hereby declare that the following is a full, clear, and exact description thereof, reference being had to the accompanying drawings through letters of reference marked thereon.

In the casting of iron car-wheels with a chilled rim the metal in flowing in against the chill solidifies immediately on coming in contact with it, and in the variety of wheels used prior to my invention the continuous flow of the metal, in rising to fill the mold of the rim, disturbs the metal which had previously flowed in and become partially set, thus injuring the compactness of the metal in the part of the wheel on which is the most wear.

The object of my invention is to prevent this, which is accomplished by forming the disk of a cast-iron wheel of a corrugated or waved shape, the exterior periphery of which unites with the rim of the wheel in a serpentine or zigzag line from side to side all round, so that the metal in flowing in finds a channel, from first to last, on a level with the surface of that which preceded it, so that it is never disturbed after it once comes in contact with the chill. This corrugated disk is also essential to compensate for the unequal contraction of the metal in the direction of the circumference, arising from the rim being cooled first by coming in contact with the chill in the process of casting.

Figure 2:
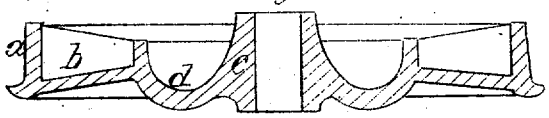
Figure 1:
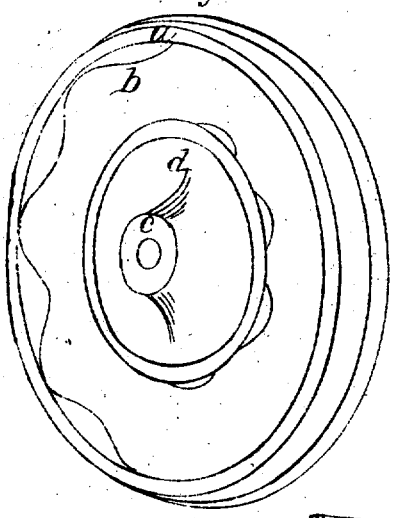
Figure 3:
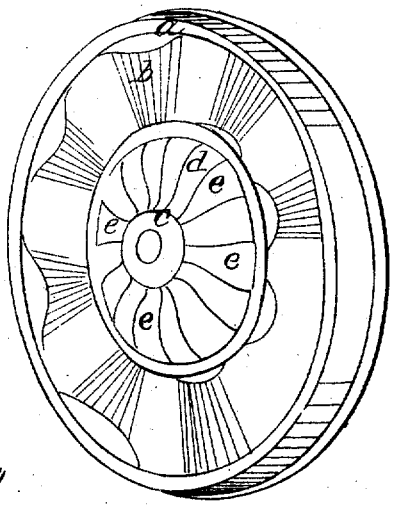
Figure 4:
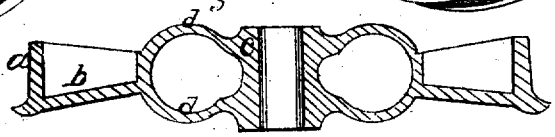

In the accompanying drawings, Figure 3 is a perspective view of my wheel, and Fig. 4 a section through the axis of the same.

*c* represents the solid hub; *d*, the arch or hollow ring that surrounds it. *e e* are orifices in this ring to admit the removal of the core after the casting has been made. *a* represents the rim, and *b* the single plate connecting it with the ring or arch. The two plates, starting from near the ends of the hub, and meeting about midway between it and the rim, constitute a kind of brace to resist the lateral strain upon the wheel. Their curved form, also, as represented in the drawings, is best adapted to yield to the radial contraction of the wheel after the setting of the rim from the effect of the chill thereon in the process of casting. I cast the single plate *b* in the form of a succession of waves, passing entirely around, by a series of curves or angles, from one edge of the rim to the other to give a continuous support to the whole width of the rim and provide for the contraction of the plate in the direction of the circumference of the wheel, also to admit the flowing in of the metal to the rim on the surface of that which preceded it without disturbing it after it has partially set against the chill, thus insuring a more solid rim and perfect chill.

The place of greatest strain in railroad car-wheels, as well as in those for common roads, is at or near the hub, and that part should have greater strength of structure than those nearer the rim. The two plates, therefore, rising from the hub and extending part of the way, and a single plate for the remainder, properly apportions the material to the strength required.

What I claim as new, and desire to secure by Letters Patent, is—

A cast-iron disk corrugated in the manner substantially as and for the purposes described, when used in connection with the chilled rim of a cast-iron wheel.

ANSON ATWOOD.

Witnesses:

W. SESKI,

WM. M. SMITH.